(12) United States Patent
Cha et al.

(10) Patent No.: US 11,016,347 B2
(45) Date of Patent: May 25, 2021

(54) DISPLAY DEVICE

(71) Applicant: Samsung Display Co., Ltd., Yongin-Si (KR)

(72) Inventors: Na Hyeon Cha, Yongin-si (KR); Sun Kwun Son, Suwon-si (KR); Dae Ki Park, Seoul (KR); Hwan Young Jang, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/810,801

(22) Filed: Mar. 5, 2020

(65) Prior Publication Data

US 2021/0033932 A1  Feb. 4, 2021

(30) Foreign Application Priority Data

Aug. 2, 2019 (KR) .................... 10-2019-0094410

(51) Int. Cl.
*G02F 1/1343* (2006.01)
*G02F 1/133* (2006.01)
*G02F 1/1333* (2006.01)

(52) U.S. Cl.
CPC .... *G02F 1/134309* (2013.01); *G02F 1/13306* (2013.01); *G02F 1/133354* (2021.01); *G02F 2201/122* (2013.01); *G02F 2201/123* (2013.01)

(58) Field of Classification Search
CPC ............. G02F 1/133514; G02F 1/1393; G02F 1/133305; G02F 1/134309; G02F 1/13306; G02F 2201/122; G02F 2201/123; G02F 1/133354

USPC .................................................. 349/158–160
See application file for complete search history.

(56) References Cited

U.S. PATENT DOCUMENTS

| | | | |
|---|---|---|---|
| 9,495,932 B2 | 11/2016 | Park et al. | |
| 2006/0290841 A1* | 12/2006 | Kwon | G02F 1/1362 349/110 |
| 2013/0093658 A1* | 4/2013 | Park | G02F 1/136286 345/92 |
| 2018/0188595 A1* | 7/2018 | Kim | H01L 51/0011 |

FOREIGN PATENT DOCUMENTS

| KR | 10-2007-0000547 A | 1/2007 |
|---|---|---|
| KR | 10-2010-0108756 A | 10/2010 |
| KR | 10-2016-0141189 A | 12/2016 |
| KR | 10-2018-0078409 A | 7/2018 |

\* cited by examiner

*Primary Examiner* — Charles S Chang
(74) *Attorney, Agent, or Firm* — Innovation Counsel LLP

(57) ABSTRACT

An embodiment of the present disclosure provides a display device including a substrate including a display area in which a plurality of pixel groups are disposed and a peripheral area disposed around the display area, and a plurality of alignment keys disposed on the substrate, wherein each of the pixel groups may include a plurality of pixels displaying different colors, and the plurality of alignment keys may include first alignment keys that are disposed in the pixel groups adjacent to edges of at least two corners of the display area and that are disposed in a plurality of first pixels that display the same color among a plurality of pixels included in the pixel group.

20 Claims, 13 Drawing Sheets

DISPLAY DEVICE

CROSS-REFERENCE TO RELATED APPLICATION

This application claims priority to and the benefit of Korean Patent Application No. 10-2019-0094410 filed in the Korean Intellectual Property Office on Aug. 2, 2019, the entire contents of which are incorporated herein by reference.

BACKGROUND (a) Technical Field

The present disclosure relates to a display device.

(b) Description of the Related Art

A display device such as a liquid crystal display (LCD), an organic light emitting diode (OLED) display, etc. includes a display panel including a plurality of pixels that can display an image. Each pixel includes a pixel electrode for receiving a data signal, and the pixel electrode is connected to at least one transistor to receive the data signal. A manufacturing process of the display panel includes a process of stacking and patterning a plurality of layers on a mother substrate to form a plurality of pixels, a process of dividing the mother substrate in units of cells, a process of inspecting the divided display panels, and a module process of assembling components such as a polarizer, a driving circuit chip, and a circuit board in the display panel.

In various manufacturing processes of the display panel as described above, an alignment key as a reference for accurately recognizing a position for patterning a layer, a position for dividing a mother substrate in units of cells, and a position for attaching a component such as a polarizer may be used, which is usually formed in the display panel.

The display panel includes a display area for displaying an image, and a peripheral area disposed in the display area and not displaying an image. The alignment key is generally disposed in the peripheral area of the display panel. The alignment key may be recognized through an alignment key recognition device such as a camera or a laser of process equipment.

The above information disclosed in this Background section is only for understanding of the background of the present disclosure, and therefore it may contain information that does not form the prior art that is already known in this country to a person of ordinary skill in the art.

SUMMARY

The present disclosure has been made in an effort to provide a display device including an alignment key that may be easily recognized while avoiding defects in a peripheral area of a display panel and that may minimize a decrease in luminance of the display area.

An embodiment of the present disclosure provides a display device including a substrate including a display area in which a plurality of pixel groups are disposed and a peripheral area disposed around the display area; and a plurality of alignment keys disposed on the substrate, wherein each of the pixel groups may include a plurality of pixels displaying different colors, and the plurality of alignment keys may include first alignment keys that are disposed in the pixel groups adjacent to edges of at least two corners of the display area and that are disposed in a plurality of first pixels that display the same color among a plurality of pixels included in the pixel group.

Another embodiment of the present disclosure provides a display device including a substrate including a display area in which a plurality of pixel groups are disposed and a peripheral area disposed around the display area; and a plurality of alignment keys disposed on the substrate, wherein each of the pixel groups may include a plurality of pixels displaying different colors, the substrate may include a first edge extending in a first direction, and the plurality of alignment keys may include a plurality of first alignment keys that are disposed in the pixel group disposed closest to the first edge among the plurality of pixel groups and that are disposed in display portions of a plurality of first pixels that display the same color among a plurality of pixels included in the pixel group.

Another embodiment of the present disclosure provides a display device including a substrate including a display area in which a plurality of pixel groups are disposed and a peripheral area disposed around the display area; and an alignment key disposed on the substrate, wherein each of the pixel groups may include a plurality of pixels displaying different colors, a first pixel included in the plurality of pixels may include a pixel electrode disposed in a display portion that displays light and through which light is transmitted, the pixel electrode may include a stem and a plurality of branches connected to the stem, and the alignment key may overlap the stem and may be opaque.

According to the embodiments of the present disclosure, a display device including an alignment key that may be easily recognized while avoiding defects in a peripheral area of a display panel and that may minimize a decrease in luminance of the display area, is provided.

DETAILED DESCRIPTION OF THE EMBODIMENTS

Figure 1:
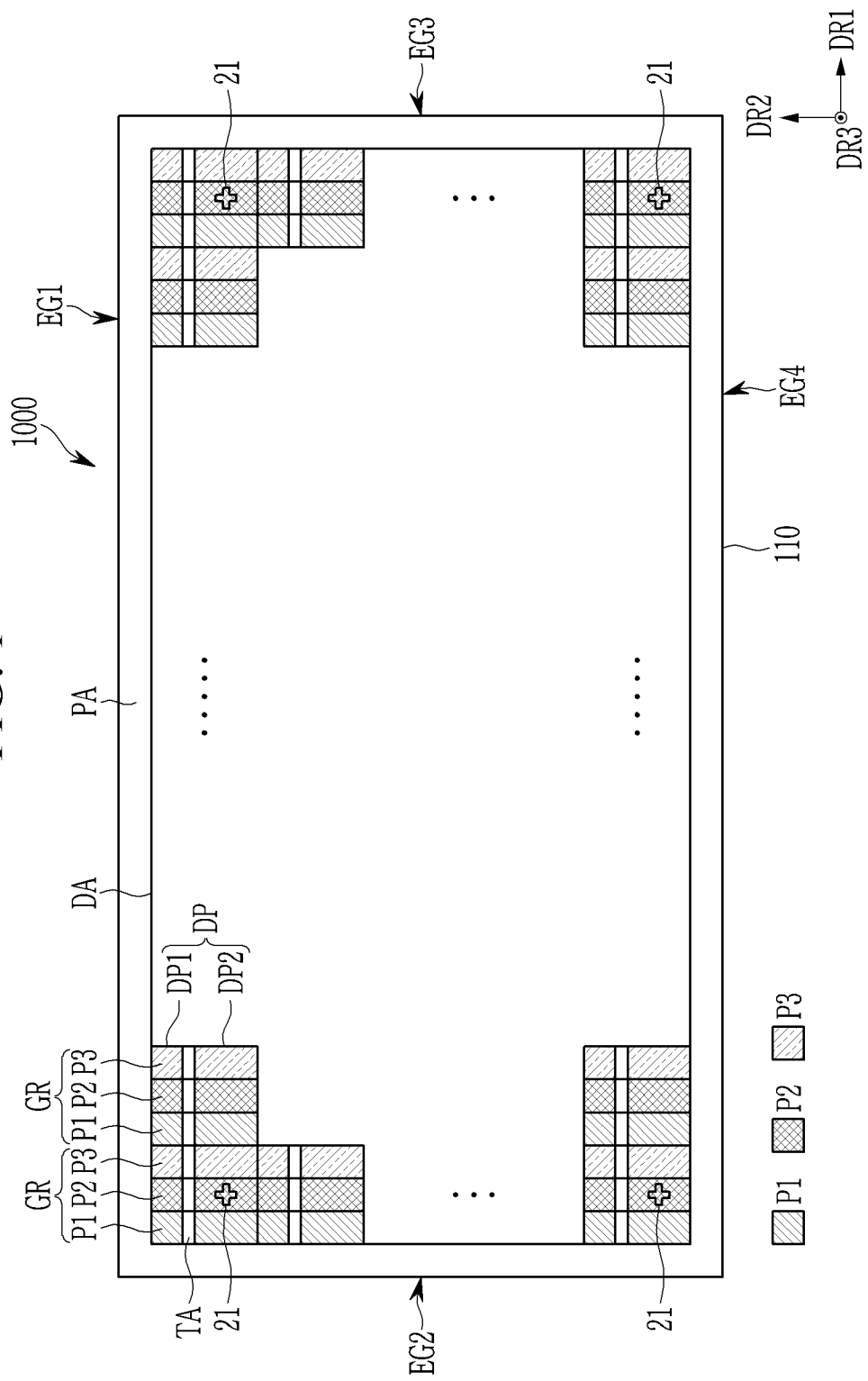
FIG. 1 illustrates a plane layout view of a display device according to an embodiment of the present disclosure.

The present disclosure is described more fully hereinafter with reference to the accompanying drawings, in which embodiments of the disclosure are shown.

Parts that are irrelevant to the description will be omitted to clearly describe the present disclosure, and like reference numerals designate like elements throughout the specification.

Further, in the drawings, the size and thickness of each element are arbitrarily illustrated for ease of description, but the present disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout this specification, a plan view means a view when observing a surface parallel to two directions (e.g., a first direction DR1 and a second direction DR2) crossing each other, and a cross-sectional view means a view when observing a surface cut in a direction (e.g., a third direction) perpendicular to the surface parallel to the first direction DR1 and the second direction DR2. Also, to overlap two constituent elements means that two constituent elements are overlapped in the third direction (e.g., a direction perpendicular to an upper surface of the substrate) unless stated otherwise.

First, referring to FIG. 1, a display device according to an embodiment of the present disclosure is described.

FIG. 1 illustrates a plane layout view of a display device according to an embodiment of the present disclosure.

Referring to FIG. 1, a display device according to an embodiment of the present disclosure includes a display panel 1000, and the display panel 1000 includes a substrate 110 including a display area DA and a peripheral area PA.

The display area DA is an area capable of displaying an image and includes a plurality of pixels P1, P2, and P3 and a plurality of signal lines that are regularly arranged.

Each of the pixels P1, P2, and P3 is a unit for displaying an image, and may display light having luminance corresponding to a gray level of each image signal.

Each of the pixels P1, P2, and P3 may include a pixel circuit portion TA including at least one transistor, and a display portion DP. The pixel circuit portion TA may include at least one transistor connected to a signal line disposed in the display area DA. The display portion DP may include a pixel electrode capable of receiving a data signal from the pixel circuit portion TA, and is an area through and in which light is transmitted or displayed. The display portion DP and the pixel circuit portion TA for one pixel P1, P2, or P3 may or may not overlap each other in a plan view.

FIG. 1 shows an example in which each of pixels P1, P2, and P3 includes the pixel circuit portion TA and two display portions DP1 and DP2 disposed up and down with respect to the pixel circuit portion TA, but the structures of the pixels P1, P2, and P3 are not limited to this.

The plurality of pixels P1, P2, and P3 may include a first pixel P1, a second pixel P2, and a third pixel P3, which may display different colors. The different colors displayed by the first pixel P1, the second pixel P2, and the third pixel P3 may be one of primary colors such as three primary colors of red, green, and blue, or four primary colors. An example in which the first pixel P1 displays red, the second pixel P2 displays green, and the third pixel P3 displays blue is mainly described.

Several adjacent pixels P1, P2, and P3 together may form a pixel group GR that can display various colors including gray-based colors such as white and black, and the pixel group GR may be repeatedly arranged in the display area DA. For example, the pixel group GR may be repeatedly arranged in a first direction DR1 and a second direction DR2 as shown in FIG. 1. In some embodiments, one pixel group GR may further include a pixel displaying a white color or may include four or more pixels. According to another embodiment, the adjacent pixel groups GR may share at least one pixel P1, P2, or P3.

FIG. 1 illustrates an example in which the first pixel P1, the second pixel P2, and the third pixel P3 are sequentially arranged in the first direction DR1 within one pixel group GR, but the arrangement of the plurality of pixels P1, P2, and P3 and the arrangement of the plurality of pixel groups GR are not limited to those shown in FIG. 1.

The peripheral area PA may be an area that does not display an image, and a pad portion to which various signal wires, an inspection circuit, a circuit board, and the like may be connected can be disposed in the peripheral area PA.

The display panel 1000 according to the embodiment of the present disclosure may include a plurality of alignment keys 21 that are disposed in the display area DA and that are disposed in the pixels P1, P2, and P3 of the pixel group GR disposed nearest to an edge of the substrate 110. The alignment keys 21 may be disposed in the pixels P1, P2, and P3 of the pixel group GR disposed adjacent to edges of at least two corners of the display area DA. FIG. 1 illustrates an example in which the alignment keys 21 are disposed in the pixels P1, P2, and P3 of the four pixel groups GR disposed adjacent to edges of four corners of the display area DA, respectively.

The alignment keys 21 according to the present embodiment may not be disposed in a pixel group GR other than the four pixel groups GR disposed adjacent to the edges of the four corners of the display area DA.

Alignment keys 21 may be disposed in the display portion DP among the pixels P1, P2, and P3 to overlap the display portion DP.

The alignment keys 21 may be used as references for designating an area or a position, so as to align a mask and a mother substrate when a plurality of layers are stacked and patterned on a mother substrate during a manufacturing process of the display panel 1000, so as to align a cutting device and the mother substrate when the mother substrate is divided into cell units, so as to align the inspection device and the display panel 1000 when inspecting the display panel 1000, or so as to align the display panel 1000 and components when assembling the components such as a polarizer and a circuit board to the display panel 1000.

Alignment keys 21 may be disposed in the display portion DP of the second pixel P2 disposed at a center among the pixels P1, P2, and P3 of each of the pixel groups GR disposed adjacent to the edges of the four corners of the display area DA. In this case, distances from a left edge EG2 to the left-most alignment key 21 and from a right edge EG3 to the right-most alignment key 21 are the same, and four alignment keys 21 may be disposed with each other along the first direction DR1 and the second direction DR2 in the display area DA.

Distances between the edges EG1, EG2, EG3, and EG4 and the alignment keys 21 disposed to the closest edge may be within a distance such that the alignment key recognition device such as a camera or a laser that recognizes the alignment keys 21 may be moved or recognized. Distances from the edges EG1, EG2, EG3, and EG4 of the substrate 110 to adjacent alignment keys 21 may be, for example, about 0.8 mm or less, but are not limited thereto and may vary depending on process equipment.

According to the present embodiment, since the alignment keys 21 are disposed adjacent to the edges of the four corners of the display area DA and are disposed at the pixels P1, P2, and P3 of the outermost pixel groups GR closest to the edges of the substrate 110, when the display area DA displays an image, the alignment keys 21 may not be well recognized, and the distance such that the alignment key recognition device may recognize them may be reduced, and thus the possibility of misalignment may be reduced. In addition, since each of the alignment keys 21 is commonly disposed in the second pixel P2 among the pixels P1, P2, and P3 of each pixel group GR, a luminance reduction amount due to the alignment keys 21 may be uniform around the four corners of the display area DA, and the symmetry may be maintained to more easily align the display panel 1000 with other devices or components. In addition, since all the four alignment keys 21 are disposed in the second pixels P2 displaying the same color, the color coordinates of the image may be prevented from being distorted. As described above, the second pixel P2 may display a green color.

According to an embodiment of the present disclosure, each pixel P1, P2, or P3 may include a plurality of subpixels capable of displaying light of luminance according to different gamma curves for one image signal, thereby improving visibility. In FIG. 1, two display portions DP1 and DP2 included in one pixel P1, P2, or P3 may be display portions corresponding to two subpixels. That is, the display portions DP1 and DP2 of one pixel P1, P2, or P3 may display light of different luminance for one input image signal.

Figure 2:
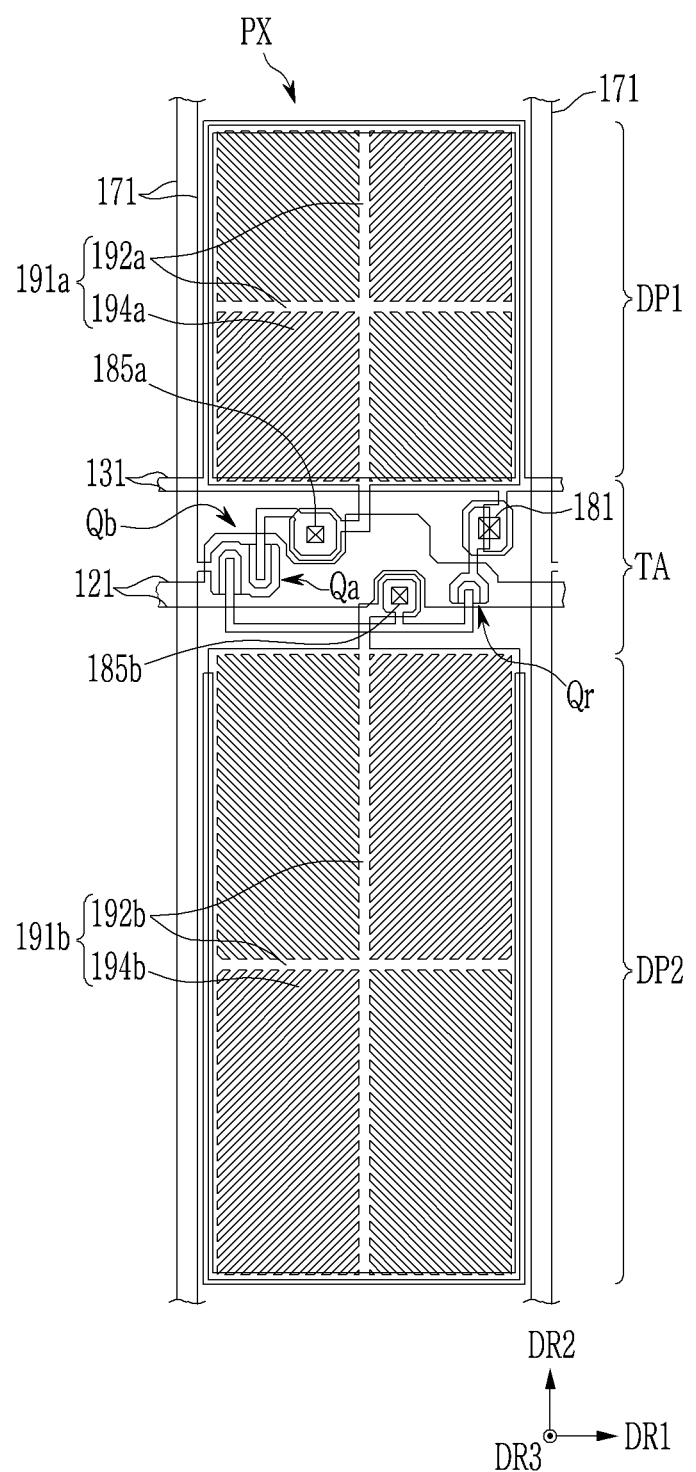
FIG. 2 illustrates a plane layout view of one pixel of a display device according to an embodiment of the present disclosure.
Figure 3:
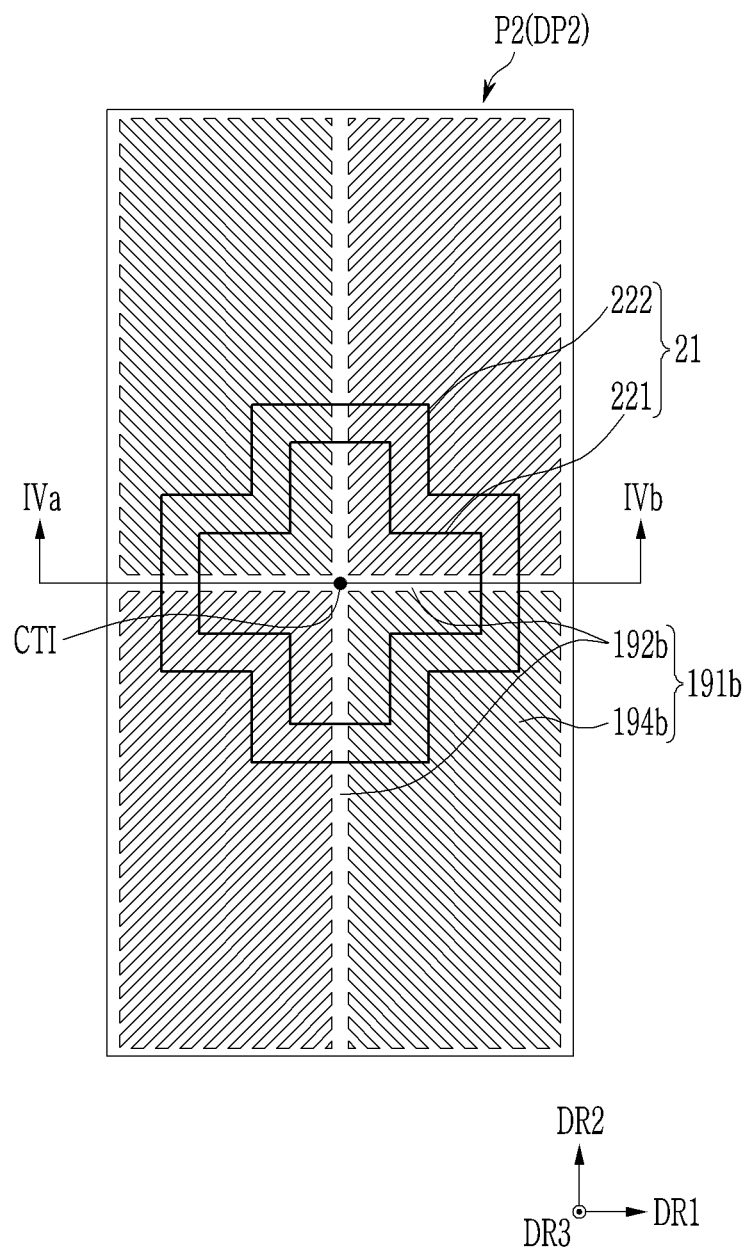
FIG. 3 illustrates a top plan view of a portion of one pixel where an alignment key of a display device according to an embodiment of the present disclosure is disposed.
Figure 4:
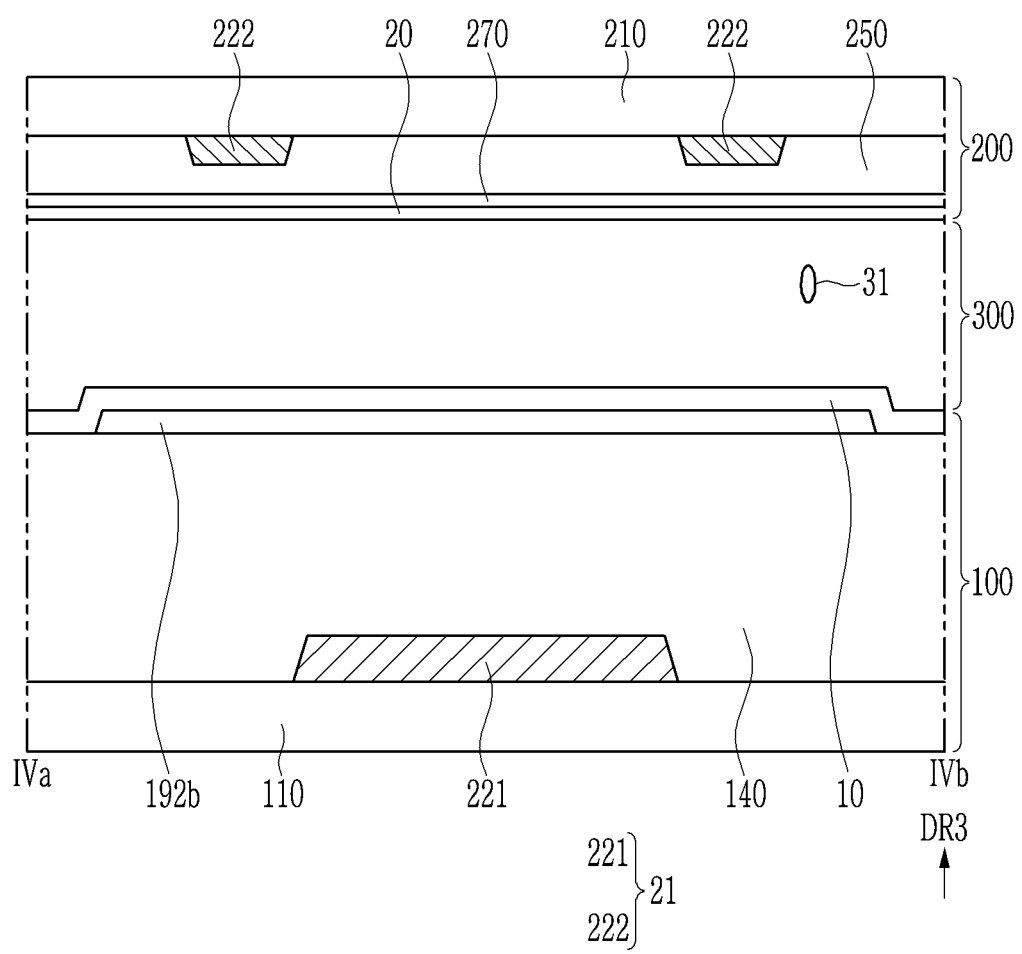
FIG. 4 illustrates a cross-sectional view of the display device taken along line IVa-IVb of FIG. 3.

The embodiment in which one pixel P1, P2, or P3 includes a plurality of subpixels 2 is described with references FIG. 2 to FIG. 4 together with FIG. 1 described above.

FIG. 2 illustrates a plane layout view of one pixel of a display device according to an embodiment of the present disclosure, FIG. 3 illustrates a top plan view of a portion of one pixel where an alignment key of a display device according to an embodiment of the present disclosure is disposed, and FIG. 4 illustrates a cross-sectional view of the display device taken along line IVa-IVb of FIG. 3.

The pixels P1, P2, and P3 of the display device according to the embodiment of the present disclosure may have the same structure as the pixel PX shown in FIGS. 2 to FIG. 4.

Referring to FIG. 4, the display device according to the embodiment may be a liquid crystal display including a first display panel 100 and a second display panel 200 facing each other, and a liquid crystal layer 300 disposed between the two display panels 100 and 200.

Referring to FIG. 2 and FIG. 4, the first display panel 100 may include a gate line 121, a reference voltage line 131, a data line 171, a first subpixel electrode 191a, and a second subpixel electrode 191b, which are disposed on the substrate 110.

The gate line 121 and the reference voltage line 131 may be disposed on the same conductive layer on the substrate 110 and may substantially extend in the first direction DR1. The data line 171 may be disposed on a different conductive layer from the gate line 121 and the reference voltage line 131, and may cross the gate line 121 and the reference voltage line 131.

Referring to FIG. 2, the pixel circuit TA of one pixel PX may include a first transistor Qa and a second transistor Qb electrically connected to the gate line 121 and the data line 171, and a third transistor Qr electrically connected to the second transistor Qb.

Referring to FIG. 4, at least one insulating layer 140 may be disposed between the first subpixel electrode 191a, the second subpixel electrode 191b, and the substrate 110. The insulating layer 140 may be disposed between the transistors Qa, Qb, and Qr and the first and second subpixel electrodes 191a and 191b.

The first subpixel electrode 191a may be electrically connected to the first transistor Qa through an opening 185a of at least one insulating layer 140 to receive a data voltage, and the second subpixel electrode 191b may be electrically connected to the first transistor Qb through an opening 185bof the at least one insulating layer 140 to receive a data voltage. Most of the first subpixel electrode 191a may be disposed to the corresponding display portion DP1 of the pixel PX, and most of the second subpixel electrode 191b may be disposed to the corresponding display portion DP2 of the pixel PX. That is, the first subpixel electrode 191a and the second subpixel electrode 191b may be disposed opposite to each other with the pixel circuit TA in between. The third transistor Qr may be electrically connected to the reference voltage line 131 through an opening 181 of the at least one insulating layer 140.

In the present embodiment, an example in which the display portion DP2 in which the second subpixel electrode 191b is disposed displays light having the same brightness as or lower than that of the display portion DP1 in which the first subpixel electrode 191a is disposed, is mainly described. In this case, the display portion DP2 is referred to as a low gray subpixel, and the display portion DP1 is referred to as a high gray subpixel. A planar area of the display portion DP2 may be larger than that of the display portion DP1, and more specifically, a length of the second direction DR2 of the display portion DP2 may be longer than that of the display portion DP1. FIG. 1 and FIG. 2 illustrate an example in which the display portion DP2, which is the low gray subpixel, is disposed below the display portion DP1, which is the high gray subpixel, but the present disclosure is not limited thereto, and the positions of the two display portions DP1 and DP2 may be changed.

In a plan view, the first subpixel electrode 191a and the second subpixel electrode 191b may respectively include stems 192a and 192b and a plurality of branches 194a and 194b. The stems 192a and 192b may be cross stems including horizontal stems and vertical stems that cross each other. The branches 194a and 194b may be connected to the stems 192a and 192b, and may extend in an direction that is oblique to a direction in which the gate line 121 and the data line 171 extend.

The first and second subpixel electrodes 191a and 191b may include a transparent conductive material such as an ITO, an IZO, a metal thin film, or the like.

Referring to FIG. 4, in the second display panel 200, an insulating layer 250 and a common electrode 270 may be disposed under a substrate 210 (a direction toward the first display panel 100 is referred to as "under"). The common electrode 270 may transmit a common voltage, and may be continuously formed on an entire surface of a lower portion of the substrate 210. The common electrode 270 may include a transparent conductive material such as an ITO, an IZO, or a metal thin film.

The liquid crystal layer300 may include a plurality of liquid crystal molecules 31.

Alignment films 10 and 20 may be respectively disposed on surfaces of the first display panel 100 and the second display panel 200 adjacent to the liquid crystal layer 300. The alignment films 10 and 20 may be vertical alignment films.

As described above, the alignment keys 21 according to the embodiment of the present disclosure may be disposed at the display portion of the central pixel P2, of the pixels P1, P2, and P3 of the pixel group GR disposed adjacent to the edges of the four corners of the display area DA, and may be disposed in the display portion DP2, which is a low gray subpixel capable of displaying lower luminance among the two display portions DP1 and DP2 of the second pixel P2.

Specifically, when the pixels P1, P2, and P3 have the structure shown in FIG. 2, as shown in FIG. 1 and FIG. 3, the alignment key 21 may be disposed in the display portion DP2 that is a low gray subpixel of the second pixel P2.

The alignment key 21 according to an embodiment of the present disclosure may overlap the stem 192b of the second subpixel electrode 191b disposed in the display portion DP2, and in particular, may overlap and enclose a center CT1 of the stem192b.

The alignment key 21 may have various shapes, and for an example, it may form a cross (+) in a plan view as shown in FIG. 1 and FIG. 3. A center of the cross alignment key 21 may substantially coincide with the center CT1 of the stem 192b of the second subpixel electrode 191b. Horizontally and vertically extending portions of the cross alignment key 21 may extend side by side with horizontal and vertical portions of the stem 192b of the second subpixel electrode 191b and overlap horizontal and vertical portions of the stem 192b of the second subpixel electrode 191b.

When the second pixel P2 is driven, an area around the stem 192b of the second subpixel electrode 191b has low luminance because a direction in which the liquid crystal molecules 31 are inclined is not well controlled, and thus, by disposing the alignment key 21 so as to overlap the stem 192b having relatively low luminance, a decrease in luminance of the second pixel P2 caused by the alignment key 21 may be minimized.

In a plan view, the alignment key 21 may be disposed on various layers of the display panel 1000, and may include an opaque material that blocks light. Referring to FIG. 3 and FIG. 4, the alignment keys 21 may be disposed on the substrate 110 or on various layers above or below the substrate 110, and for example, the alignment keys 21 may be disposed on the same conductive layer as the gate line 121 described above and may be formed of metal, and they may include an alignment key 221 that may include a metal.

The alignment keys 21 may further include an alignment key 222 disposed on a different layer from the alignment key 221. For example, the alignment key 222 may be disposed on the same layer as a light blocking member disposed below the substrate 210, and may include a light blocking material such as the light blocking member. The light blocking member may include a portion overlapping the pixel circuit portion TA of the display area DA and a portion overlapping the peripheral area PA in a plan view. The light blocking member and the alignment key 222 may include a pigment such as carbon black. The light blocking member and the alignment key 222 may be disposed between the substrate 210 and the insulating layer 250.

In a plan view, the alignment key 222 may surround the alignment key 221 as shown in FIG. 3.

Since the alignment key 21 includes the alignment key 222, the alignment key recognition device may better recognize the position of the alignment key 21, and the position of the alignment key 21 may be well recognized even on the substrate 210.

According to the embodiment of the present disclosure, since the alignment key 21 may not be formed in the peripheral area PA, the alignment key 21 may be free from constraints that may occur when the alignment key is formed in the peripheral area PA. For example, when a sealant for bonding the two substrates 110 and 210 is disposed in the peripheral area PA, there may be various constraints to prevent a risk of uncuring the sealant when the alignment key does not overlap the sealant or overlaps the sealant, and there may be defects in the peripheral area PA. However, according to the embodiment of the present disclosure, it is possible to be free from these constraints and to avoid the defects of the peripheral area PA by the alignment key. In particular, in a display device having a narrow peripheral area PA, the alignment key may be easily recognized by forming the alignment key in the display area DA as in the embodiment of the present disclosure, and the display panel and other parts or devices may be effectively aligned or stacked together.

Hereinafter, a display device according to an embodiment of the present disclosure is described with reference to FIG. 5 to FIG. 8 together with the drawings described above.

Figure 5:
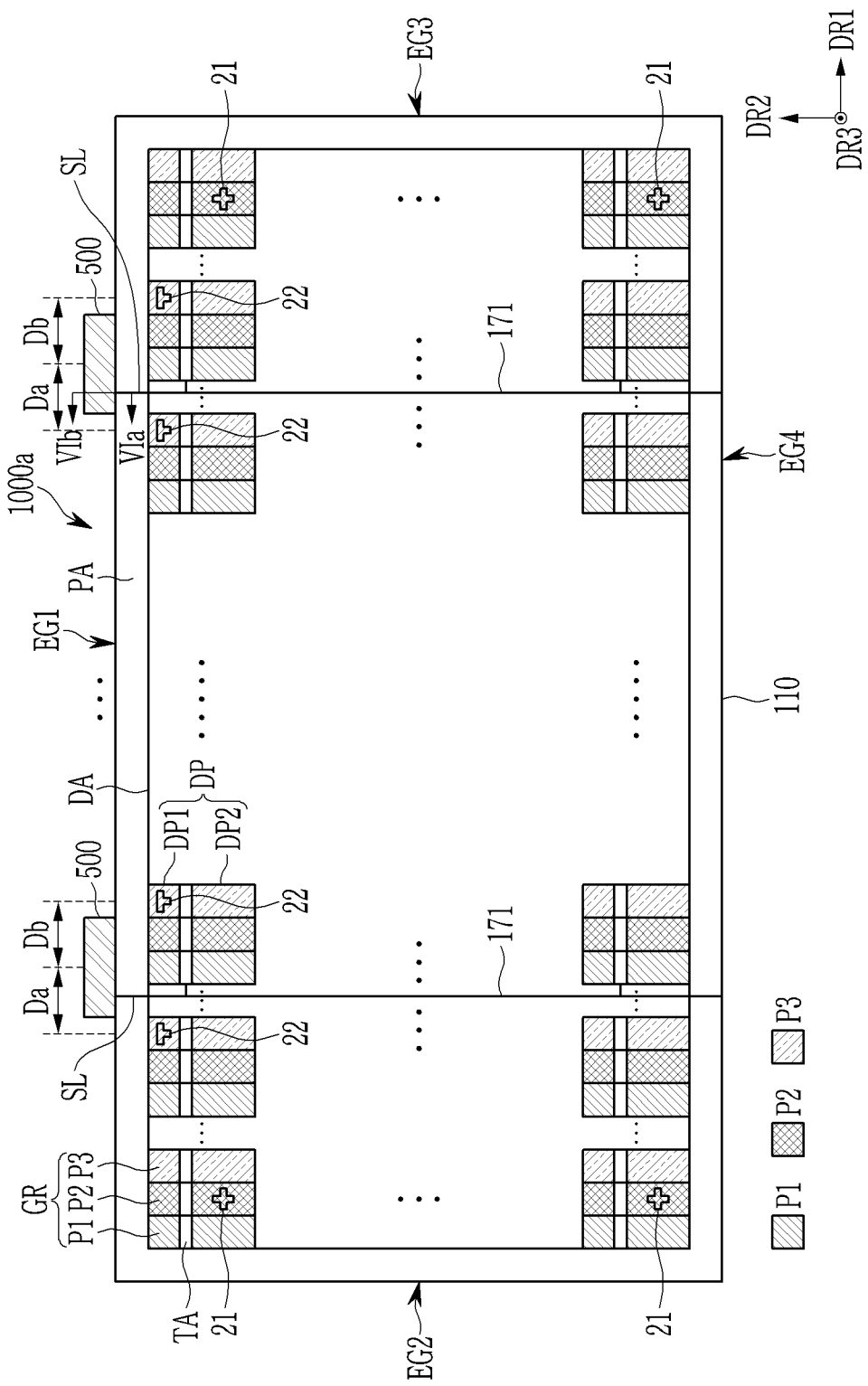
FIG. 5 illustrates a plane layout view of a display device according to an embodiment of the present disclosure.
Figure 6:
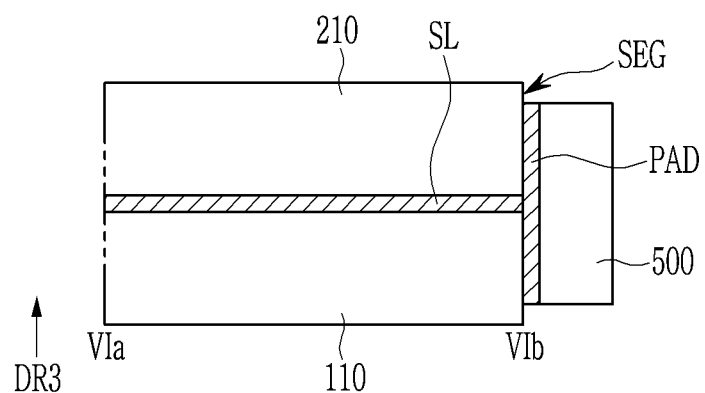
FIG. 6 illustrates a cross-sectional view taken along line VIa-VIb of the display device shown in FIG. 5.
Figure 7:
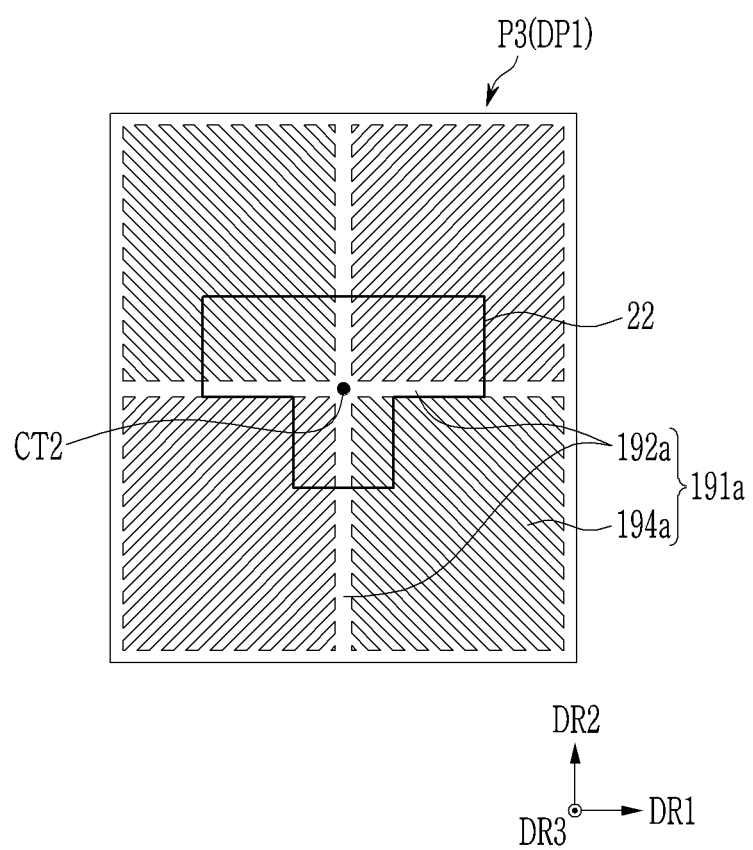
FIG. 7 illustrates a top plan view of a portion of one pixel where an alignment key of a display device according to an embodiment of the present disclosure is disposed.

FIG. 5 illustrates a plane layout view of a display device according to an embodiment of the present disclosure, FIG. 6 illustrates a cross-sectional view taken along line VIa-VIb of the display device shown in FIG. 5, and FIG. 7 illustrates a top plan view of a portion of one pixel where an alignment key of a display device according to an embodiment of the present disclosure is disposed.

The display device according to the present embodiment includes a display panel 1000a that is mostly the same as the display panel 1000 of the above-described embodiment, and differences from the above-described embodiment are mainly described.

The display panel 1000a may further include a plurality of data lines 171 electrically connected to the plurality of pixels P1, P2, and P3. Each data line 171 may extend in parallel along the second direction DR2 in the display area DA. Each data line 171 may transmit a data signal.

The display panel 1000a may include a wire portion SL disposed in the peripheral area PA, and the plurality of data lines 171 may be connected to the wire portion SL. Referring to FIG. 6, the wire portion SL may be disposed between the substrate 110 and the substrate 210, and may be formed on the substrate 110. A conductive pad portion PAD connected to the wire portion SL may be disposed on the side surfaces SEG of the two substrates 110 and 210 that are bonded each other.

The display device according to the present embodiment may include at least one driving circuit portion 500 attached to the display panel 1000a. The driving circuit portion 500 may be attached to the pad portion PAD and electrically connected to the data line 171 through the wire portion SL to apply a data signal. The driving circuit portion 500 may have a form of at least one driving circuit chip.

The display panel 1000a according to the embodiment of the present disclosure is disposed in the display area DA, and it may include a plurality of alignment keys 22 disposed in the pixels P1, P2, and P3 of the pixel group GR disposed closest to the edge EG1 extending in the first direction DR1 among the edges of the substrate 110. The alignment keys 22 may be disposed at pixels P1, P2, and P3 of the pixel group GR disposed closest to the edge EG4 facing the edge EG1 of the substrate 110, and in this case, a separate driving circuit portion 500 may be attached to the edge EG4 of the substrate 110.

The alignment keys 22 according to the present embodiment may not be disposed in a pixel group GR other than the pixel group GR disposed closest to the edge EG1 of the substrate 110.

The alignment keys 22 may be disposed in the display portion DP of the pixels P1, P2, and P3.

The alignment keys 22 may be used as a reference for positioning the display panel 1000a and the driving circuit portion 500 when the driving circuit portion 500 is attached to the display panel 1000a.

The alignment keys 22 may be disposed in the display portion DP of the third pixel P3, which is a pixel in which the other alignment keys 21 are not disposed among the pixels P1, P2, and P3 of the pixel group GR disposed closest to the edge EG1 of the substrate 110. Colors displayed by the plurality of third pixels P3 in which the plurality of alignment keys 22 are disposed may be the same.

Unlike this, the alignment keys 22 according to another embodiment may be disposed in the display portion DP of the second pixel P2 in which the alignment keys 21 described above are disposed.

A pair of adjacent alignment keys 22 may be disposed at opposite sides of the driving circuit portion 500 corresponding to one driving circuit portion 500. The pair of adjacent alignment keys 22 may be used to align and attach one driving circuit portion 500, which is disposed in a middle region, in and to the display panel 1000a. The pair of adjacent alignment keys 22 may be symmetrically disposed based on a center of the corresponding driving circuit portion 500. That is, a distance Da from the center of the driving circuit portion 500 to the center of the alignment key 22 immediately to the left thereof may be approximately equal to a distance Db from the center of the driving circuit portion 500 to the center of the alignment key 22 immediately to the right thereof.

The distance between the edge EG1 of the substrate 110 and the plurality of alignment keys 22 may be constant, and may be within a distance such that the alignment key recognition device recognizing the alignment key 22 may move or recognize. The distance between the alignment key 22 and the edge EG1 of the substrate 110 may be, for example, about 0.8 mm or less, and may vary depending on the equipment.

According to the present embodiment, since the alignment keys 22 are disposed at the pixels P1, P2, and P3 of the outermost pixel group GR of the display area DA adjacent to the edges EG1 of the substrate 110, when the display area DA displays an image, the alignment keys 22 may not be recognized, and the distance such that the alignment key recognition device may recognize them may be reduced, and thus the possibility of misalignment may be reduced. In addition, since all the plurality of alignment keys 22 are disposed in the third pixels P3 displaying the same color, the color coordinates of the image may be prevented from being distorted.

As described above, each pixel P1, P2, or P3 may include the plurality of subpixels capable of displaying light of luminance according to different gamma curves for one image signal, thereby improving visibility. In FIG. 5, two display portions DP1 and DP2 included in one pixel P1, P2, or P3 may be display portions corresponding to two subpixels. Since the descriptions of the low gray subpixel, the high gray subpixel, and the two display portions DP1 and DP2 have been described above, the detailed descriptions thereof is omitted.

The alignment keys 22 according to the embodiment of the present disclosure may be disposed in the display portion DP1 closer to the edge EG1 of the substrate 110 among the two display portions DP1 and DP2 of the third pixel P3. When the display portion DP1 that is the high gray subpixel is disposed closer to the edge EG1 of the substrate 110 than the display portion DP2 that is the low gray subpixel, the alignment key 22 may be disposed in the display portion DP1 that is the high gray subpixel of the third pixel P3. In this case, since the luminance of the display portion DP1 that is the high gray subpixel is often higher than that of the display portion DP2 that is the low gray subpixel, the color displayed by the third pixel P3 in which the plurality of alignment keys 22 are disposed is relatively low in luminance even with respect to an input image signal having the same gray level among the pixels P1, P2, and P3 of one pixel group GR. For example, the color displayed by the third pixel P3 may be blue.

As such, when the alignment keys 22 are disposed on the display portion DP1 closest to the edge EG1 of the substrate 110 and the display area DA displays an image, the alignment keys 22 may not be well viewed, and since the alignment keys 22 are disposed in the third pixel P3 having relatively low luminance among the pixels P1, P2, and P3, they may not be viewed despite being disposed in the high gray subpixel.

The alignment keys 22 according to the embodiment of the present disclosure may overlap the stem 192a of the first subpixel electrode 191a disposed in the display portion DP1, and in particular, may overlap and enclose a center CT2 of the stem 192a.

The alignment keys 22 may have various shapes, and may have the same shape as the alignment keys 21 described above or may have a different shape. For example, the alignment keys 22 may have a "T" shape in a plan view as shown in FIG. 5 and FIG. 7.

A center of the alignment key 22 may substantially coincide with the center CT2 of the stem 192a of the first subpixel electrode 191a. Horizontally and vertically extending portions of the alignment key 22 may extend side by side with horizontal and vertical portions of the stem 192a of the first subpixel electrode 191a, and overlap the horizontal and vertical portions of the stem 192a of the first subpixel electrode 191a.

When the third pixel P3 is driven, an area around the stem 192a of the first subpixel electrode 191a has low luminance because a direction in which the liquid crystal molecules 31 are inclined is not well controlled, and thus, by disposing the alignment key 22 so as to overlap the cross stem 192a having relatively low luminance, a decrease in luminance of the third pixel P3 caused by the alignment key22 may be minimized.

Unlike the shown embodiment, the alignment key 22 may have the same shape as the alignment key 21 described above.

In a cross-section, a layer position and structure of the alignment key 22 may be the same as that of the alignment key 21 described above, and a detailed description thereof is omitted.

Figure 8:
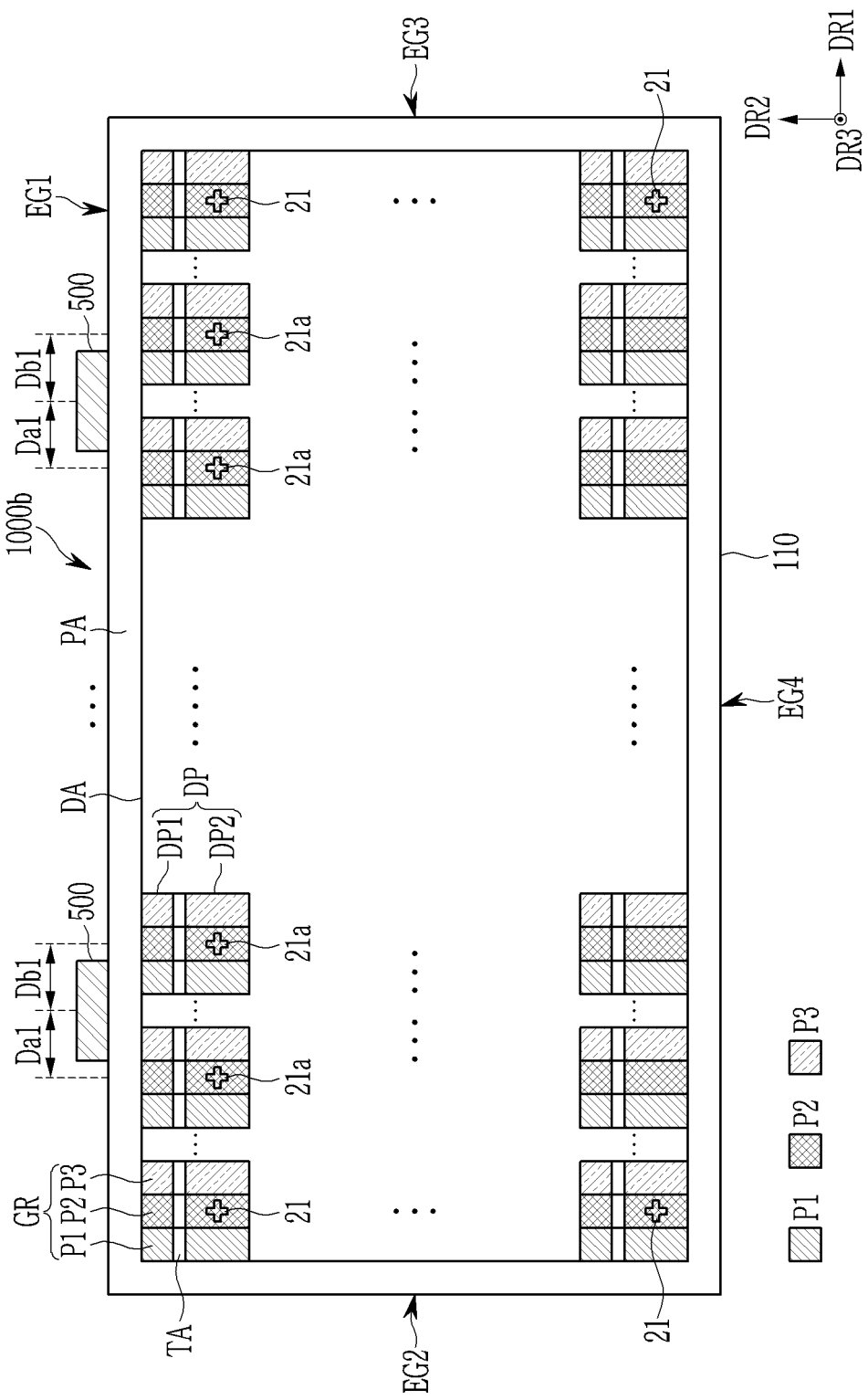
FIG. 8 illustrates a plane layout view of a display device according to an embodiment of the present disclosure.

Referring to FIG. 8, it illustrates a plane layout view of a display device according to an embodiment of the present disclosure.

FIG. 8 together with FIG. 5 to FIG. 7 described above, the display device according to the embodiment shown in FIG. 8 is mostly the same as the display device shown in FIG. 5 to FIG. 7, but includes a display panel 1000b comprising a plurality of alignment keys 21a instead of the alignment keys 22.

The plurality of alignment keys 21a may be used as a references for determining a position when the display panel 1000b and the driving circuit portion 500 are aligned, like the above-described alignment keys 22.

The alignment keys 21a may be disposed in the pixels P1, P2, and P3 of the pixel group GR, which is disposed closest to the edge EG1 of the substrate 110, and may be disposed in the display portion DP of the pixels P1, P2, and P3.

The alignment keys 21a may be disposed in the display portion DP of the second pixel P2 among the pixels P1, P2, and P3 of the pixel group GR disposed closest to the edge EG1 of the substrate 110. Colors displayed by the second pixels P2 in which the plurality of alignment keys 21a are disposed may be the same.

The second pixel P2 in which the plurality of alignment keys 21a are disposed may display the same color as the second pixel P2 in which the alignment keys 21 described above is are disposed. That is, the alignment keys 21 and the alignment keys 21a may be disposed in the display portion DP of the second pixel P2 disposed in the center between the pixels P1, P2, and P3 of each pixel group GR.

A pair of adjacent alignment keys 21a may be disposed at opposite sides of the driving circuit portion 500 corresponding to one driving circuit portion 500. The pair of adjacent alignment keys 21a may be used to align and attach one driving circuit portion 500. The pair of adjacent alignment keys 21a may be symmetrically disposed based on a center of the driving circuit portion 500 disposed in the middle. That is, a distance Da1 from the center of the driving circuit portion 500 to the center of the alignment key 21a immediately to the left of the driving circuit portion 500 may be approximately equal to a distance Db1 from the center of the driving circuit portion 500 to the center of the alignment key 21a immediately to the right of the driving circuit portion 500.

In the present embodiment, at least one of the two alignment keys 21 disposed close to the edge EG1 of the substrate 110 among the alignment keys 21 disposed at the four corners of the display area DA may also be used to align the driving circuit portion 500 together with the alignment key 21a. In this case, the alignment key 21 may be disposed immediately to the left of the driving circuit portion 500 disposed at the leftmost side, and the alignment key 21a may be disposed immediately to the right of the corresponding driving circuit portion 500.

According to the present embodiment, since all the plurality of alignment keys 21 and 21a are disposed in the second pixels P2 displaying the same color, the color coordinates of the image may be prevented from being distorted.

As in the above-described embodiment, when each of the pixels P1, P2, and P3 includes a plurality of subpixels, the alignment key 21a may be disposed in the display portion DP2, which is the low gray subpixel of the second pixel P2, as in the alignment key 21 described above. Since the plurality of alignment keys 21 and 21a are disposed in the second pixels P2 displaying the same color, when the display area DA displays an image, the color coordinates of the image may be prevented from being distorted according to the position.

As shown in FIG. 8, a planar shape of the alignment key 21a may be substantially the same as or different from that of the alignment key 21.

Like FIG. 3, the alignment key 21a may also overlap the center of the stem 192b of the second subpixel electrode 191b disposed in the display portion DP2, like the alignment key 21. Accordingly, a decrease in luminance of the second pixel P2 caused by the alignment key 21a may be minimized.

The other features of the alignment key 21a may be the same as those of the alignment key 21 described above.

Hereinafter, a display device according to an embodiment of the present disclosure is described with reference and FIG. 9 and FIG. 10 together with the drawings described above.

Figure 9:
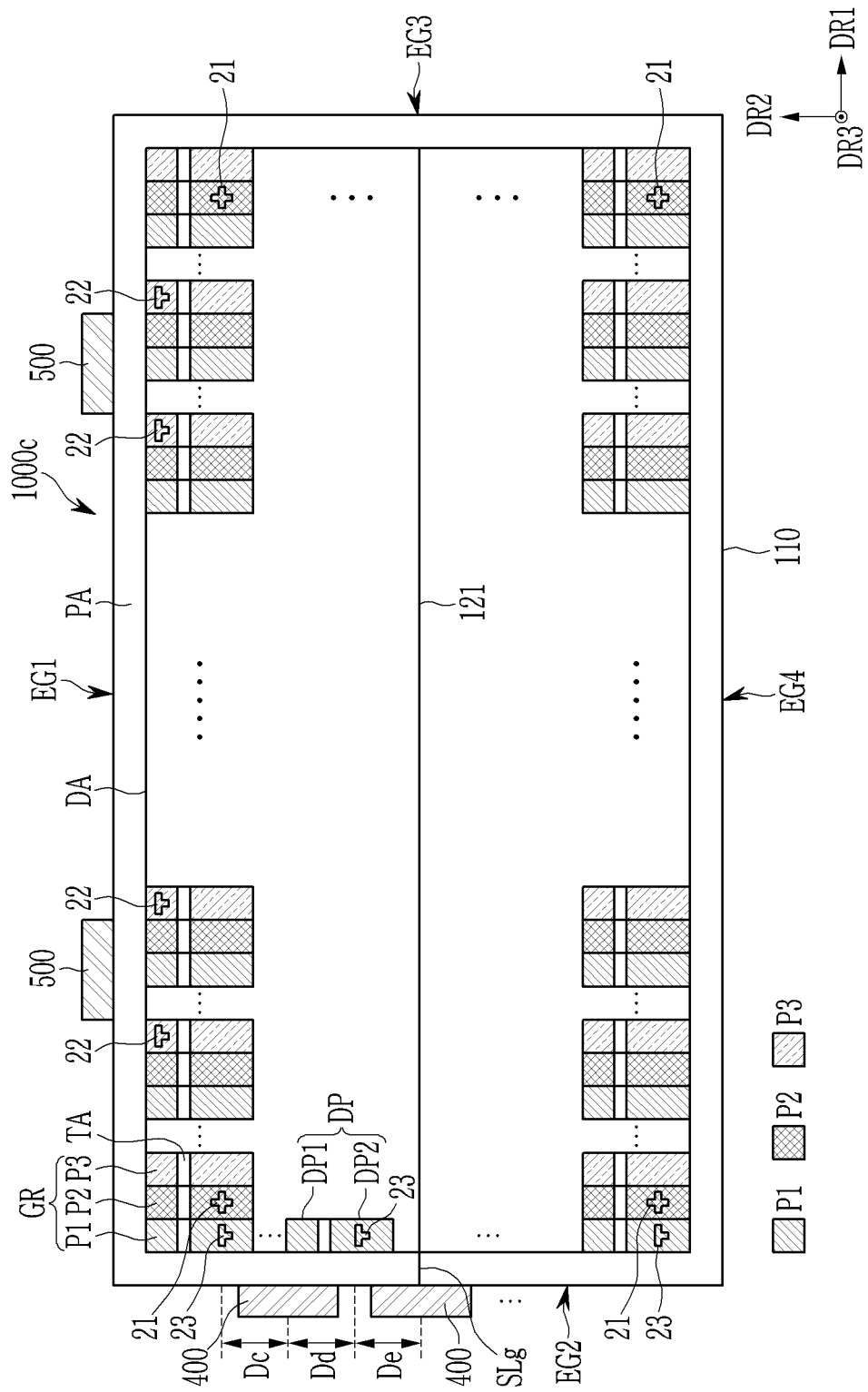
FIG. 9 illustrates a plane layout view of a display device according to an embodiment of the present disclosure.
Figure 10:
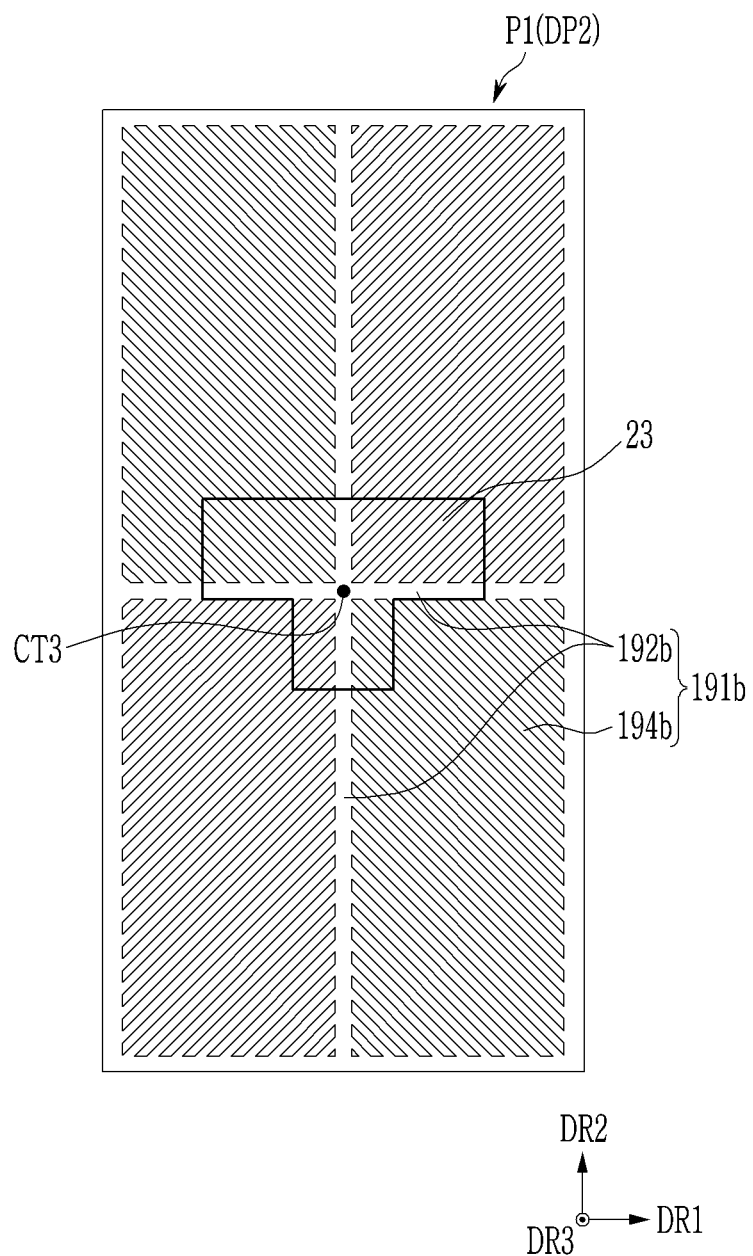
FIG. 10 illustrates a top plan view of a portion of one pixel where an alignment key of a display device according to an embodiment of the present disclosure is disposed.

FIG. 9 illustrates a plane layout view of a display device according to an embodiment of the present disclosure, and FIG. 10 illustrates a top plan view of a portion of one pixel where an alignment key of a display device according to an embodiment of the present disclosure is disposed.

The display device according to the present embodiment includes a display panel 1000c that is mostly the same as the display panel 1000a of the above-described embodiment, and thus differences from the above-described embodiment are mainly described.

The display panel 1000c may further include a plurality of gate lines 121 electrically connected to the plurality of pixels P1, P2, and P3. Each gate lines 121 may substantially extend in parallel in the second direction DR2 in the display area DA. The gate line 121 may transmit a gate signal including a gate-on voltage and a gate-off voltage.

The display panel 1000c may include a wire portion SLg disposed in the peripheral area PA, and the plurality of gate lines 121 may be connected to the wire portion SLg. Similar to the structure shown in FIG. 6 described above, the wire portion SLg may be disposed between the substrate 110 and the substrate 210, and may be formed on the substrate 110. A pad portion connected to the wire portion SLg may be disposed on side surfaces of the two substrates 110 and 210, which are bonded each other.

The display device 1000c according to the present embodiment may include at least one driving circuit portion 400 attached to the display panel 1000c. The driving circuit portion 400 may be attached to the pad portion and electrically connected to the gate 121 through the wire portion SLg to apply a gate signal. The driving circuit portion 400 may have a form of at least one driving circuit chip.

The display panel 1000c according to the embodiment of the present disclosure is disposed in the display area DA, and it may include alignment keys 23 disposed in the pixels P1, P2, and P3 of the pixel group GR disposed closest to the edge EG2 extending along the second direction DR2 among the edges of the substrate 110. The alignment keys 23 may be disposed at the pixels P1, P2, and P3 of the pixel group GR disposed closest to the edge EG3 facing the edge EG 2 of the substrate 110, and in this case, a separate driving circuit portion 400 may be attached to the edge EG3 of the substrate 110.

The alignment keys 23 according to the present embodiment may not be disposed in a pixel group GR other than the pixel group GR disposed at the edge EG2 of the substrate 110.

The alignment keys 23 may be disposed in the display portion DP of the pixels P1, P2, and P3.

The alignment keys 23 may be used as a reference for positioning the display panel 1000c and the driving circuit portion 400 when the driving circuit portion 400 is attached to the display panel 1000c.

The alignment keys 23 may be disposed in the display portion DP of the first pixel P1, which is a pixel in which the other alignment keys 21 and 22 are not disposed among the pixels P1, P2, and P3 of the pixel group GR disposed closest to the edge EG2 of the substrate 110. Colors displayed by the plurality of first pixels P1 in which the plurality of alignment keys 23 are disposed may be the same.

As depicted in FIG. 9. One alignment key 23 may be correspondingly disposed between two adjacent driving circuit portions 400 along the second direction DR2. One alignment key 23 disposed between the two adjacent driving circuit portions 400 may be used to align and attach two driving circuit portions 400 at opposite sides of the alignment key. The alignment key 23 may be correspondingly disposed to a center between two centers of the two driving circuit portions 400 disposed at opposite sides of the alignment key 23. That is, a distance Dd from a center of the driving circuit portion 400 disposed directly above the alignment key 23 to a center of the alignment key 23 may be approximately equal to a distance De from a center of the driving circuit portion 400 disposed directly below the alignment key 23 to the center of the alignment key 23.

The distance between the edge EG2 of the substrate 110 and the plurality of alignment keys 23 may be constant, and may be within a distance such that the alignment key recognition device recognizing the alignment key 23 may move or recognize. The distance between the alignment key 23 and the edge EG2 of the substrate 110 may be, for example, about 0.8 mm or less, but may vary depending on the equipment.

According to the present embodiment, since the alignment keys 23 are disposed at the pixels P1, P2, and P3 of the outermost pixel group GR of the display area DA adjacent to the edges EG2 of the substrate 110, when the display area DA displays an image, the alignment keys may not be recognized, and the distance such that the alignment key recognition device may recognize them may be reduced, and thus the possibility of misalignment may be reduced. In addition, since all the plurality of alignment keys 23 are disposed in the first pixels P1 displaying the same color, the color coordinates of the image may be prevented from being distorted.

The first pixel P1 in which the alignment keys 23 are disposed is disposed at the outermost portion of the display area DA disposed closest to the edge EG2 of the substrate 110 among a plurality of pixel columns. Therefore, when the display area DA displays an image, the alignment keys 23 may not be further recognized.

As in the above-described embodiment, each pixel P1, P2, or P3 may include the plurality of subpixels capable of displaying light of luminance according to different gamma curves for one image signal, thereby improving visibility. In FIG. 9, the two display portions DP1 and DP2 included in one pixel P1, P2, or P3 may be display portions corresponding to two subpixels. Since the descriptions of the low gray subpixel, the high gray subpixel, and the two display portions DP1 and DP2 have been described above, the descriptions thereof is omitted.

According to the embodiment of the present disclosure, the alignment key may be disposed in the display portion DP2 which is a low gray subpixel capable of displaying lower luminance among the two display portions DP1 and DP2 of the first pixel P1 in which the alignment key 23 is disposed. Specifically, when the pixels P1, P2, and P3 have the structure shown in FIG. 2 (which is described above), as shown in FIG. 9, the alignment key 23 may be disposed in the display portion DP2 that is a low gray subpixel of the first pixel P1.

As depicted in FIG. 10, the alignment key 23 according to an embodiment of the present disclosure may overlap the stem 192b of the second subpixel electrode 191b disposed in the display portion DP2, and in particular, may overlap and enclose a center CT3 of the stem 192b.

The alignment keys 23 may have various shapes, and for example, may have the same shape as the alignment keys 21 described above or may have a different shape therefrom. A planar shape of the alignment key 23 may be similar to or the same as the planar shape of the alignment key 22 described above. For example, the alignment key 23 may have a "T" shape in a plan view as shown in FIG. 9 and FIG. 10.

Referring to FIG. 10, a center of the alignment key 23 may substantially coincide with the center CT3 of the stem 192b of the second subpixel electrode 191b. Horizontally and vertically extending portions of the alignment key 23 may extend side by side with horizontal and vertical portions of the cross stem 192b of the second subpixel electrode 191b, and overlap horizontal and vertical portions of the stem 192b of the second subpixel electrode 191b.

Unlike the shown embodiment, the alignment key 23 may have the same shape as the alignment key 21 described above.

When the first pixel P1 is driven, an area around the stem 192b of the second subpixel electrode 191b has low luminance because a direction in which the liquid crystal molecules 31 are inclined is not well controlled, and thus, by forming the alignment keys 23 so as to overlap the stem 192b having relatively low luminance, a decrease in luminance of the first pixel P1 caused by the alignment keys 23 may be minimized.

Referring back to FIG. 9, one pixel P1, P2, or P3 may include two display portions DP1 and DP2, which are two subpixels, and the lengths of the second direction DR2 of the two display portions DP1 and DP2 may be different from each other. Accordingly, a distance Dc from the center of one driving circuit portion 400 to the center of the alignment key 23 immediately above thereof may be different from a distance Dd from the center of the corresponding driving circuit portion 400 to the center of the alignment key 23 immediately below thereof.

When the driving circuit portion 400 is attached along the second direction DR2, which is the direction in which the two display portions DP1 and DP2 are arranged as in the present embodiment, unlike the embodiment shown in FIG. 5 to FIG. 7 described above, in order to match the alignment of one driving circuit portion 400, it is difficult to symmetrically form the alignment key at opposite sides of the one driving circuit portion 400. However, in the present embodiment, one alignment key 23 may be formed between two adjacent driving circuit portions 400, and it is possible to accurately align the two adjacent driving circuit portions 400 using the one alignment key 23. In addition, since the one alignment key 23 is used to align the two driving circuit portions 400, the number of alignment keys may be reduced.

In a cross-section, a layer position and structure of the alignment key 23 may be the same as that of the alignment key 21 described above, and a detailed description thereof is omitted.

In the present embodiment, at least one of the alignment keys 21 and 22 may be omitted.

Hereinafter, a display device according to an embodiment of the present disclosure is described with reference to FIG. 11 together with the drawings described above.

Figure 11:
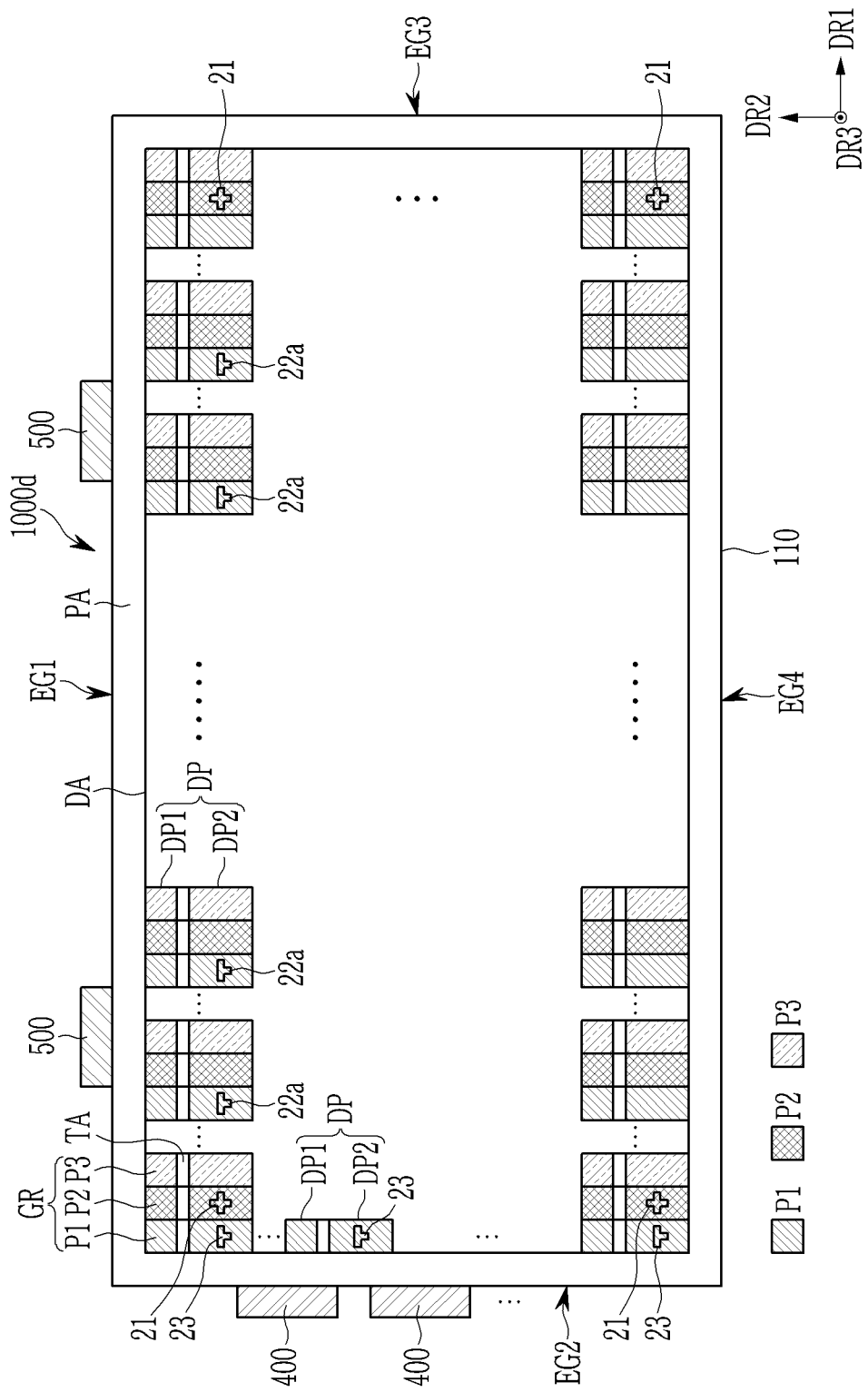
FIG. 11 illustrates a plane layout view of a display device according to an embodiment of the present disclosure.

FIG. 11 illustrates a plane layout view of a display device according to an embodiment of the present disclosure.

The display device according to the embodiment shown in FIG. 11 is mostly the same as that shown in FIG. 9 and FIG. 10, but may include a display panel 1000d including a plurality of alignment keys 22a instead of the alignment keys 22.

The plurality of alignment keys 22a may be used as a reference for determining a position when the display panel 1000d and the driving circuit portion 500 are aligned, like the above-described alignment keys 22.

The alignment keys 22a may be disposed in the pixels P1, P2, and P3 of the pixel group GR, which is disposed closest to the edge EG1 of the substrate 110, and may be disposed in the display portion DP of the pixels P1, P2, and P3.

Like the alignment keys 23, the alignment keys 22a may be disposed in the display portion DP of the first pixel P1 among the pixels P1, P2, and P3 of the pixel group GR disposed closest to the edge EG1 of the substrate 110. That is, the alignment keys 23 and the alignment keys 22a may be disposed in the display portion DP of the first pixel P1 disposed at the leftmost side among the pixels P1, P2, and P3 of each pixel group GR.

According to the present embodiment, a pair of adjacent alignment keys 22a may be disposed at opposite sides of one driving circuit portion 500 corresponding to the one driving circuit portion 500. The pair of adjacent alignment keys 22a may be used to align and attach the corresponding one driving circuit portion 500. The pair of adjacent alignment keys 22a may be symmetrically disposed based on a center of the corresponding driving circuit portion 500.

Alternatively, one alignment key 22a may be disposed between two adjacent driving circuit portions 500 along the first direction DR1. The one alignment key 22a disposed between the two adjacent driving circuit portions 500 may be used to align the two driving circuit portions 500 at opposite sides of the one alignment and attach the driving circuit portions 500 to the display panel 1000d. The alignment key 22a may be disposed corresponding to a center between two centers of the two adjacent driving circuit portions 500. Accordingly, since the one alignment key 22a is used to align the two adjacent driving circuit portions 500, the number of necessary alignment keys may be reduced.

In the present embodiment, among the alignment keys 23 disposed close to the edge EG2 of the substrate 110 used for the alignment of the driving circuit portion 400, the uppermost alignment key 23 disposed close to the edge EG1 of the substrate 110 may be used to align the driving circuit portion 500 together with the alignment key 22a. In this case, the alignment key 23 may be disposed immediately to the left of the driving circuit portion 500 disposed at the leftmost side, and the alignment key 22a may be disposed immediately to the right of the corresponding driving circuit portion 500.

Since all of the plurality of alignment keys 23 and 22a are disposed in the first pixels P1 displaying the same color, it may be effective to prevent the color coordinates of the image from being distorted.

As in the above-described embodiment, when each of the pixels P1, P2, and P3 includes a plurality of subpixels, the alignment key 22a may be disposed in the display portion DP2, which is the low gray subpixel of the first pixel P1, like the alignment key 23 described above. Since the plurality of alignment keys 23 and 22a are disposed in the first pixels P1 displaying the same color, when the display area DA displays an image, the color coordinates of the image may be prevented from being distorted according to the position.

As shown in FIG. 11, a planar shape of the alignment key 22a may be substantially the same as or different from that of the alignment key 23.

Like FIG. 10, the alignment key 22a may also overlap and enclose the center of the stem 192b of the second subpixel electrode 191b disposed in the display portion DP2, like the alignment key 23. Accordingly, a decrease in luminance of the first pixel P1 caused by the alignment key 22a may be minimized.

The other features of the alignment key 22a may be the same as those of the alignment key 23 described above.

Hereinafter, a display device according to an embodiment of the present disclosure is described with reference and FIG. 12 and FIG. 13 together with the drawings described above.

Figure 12:
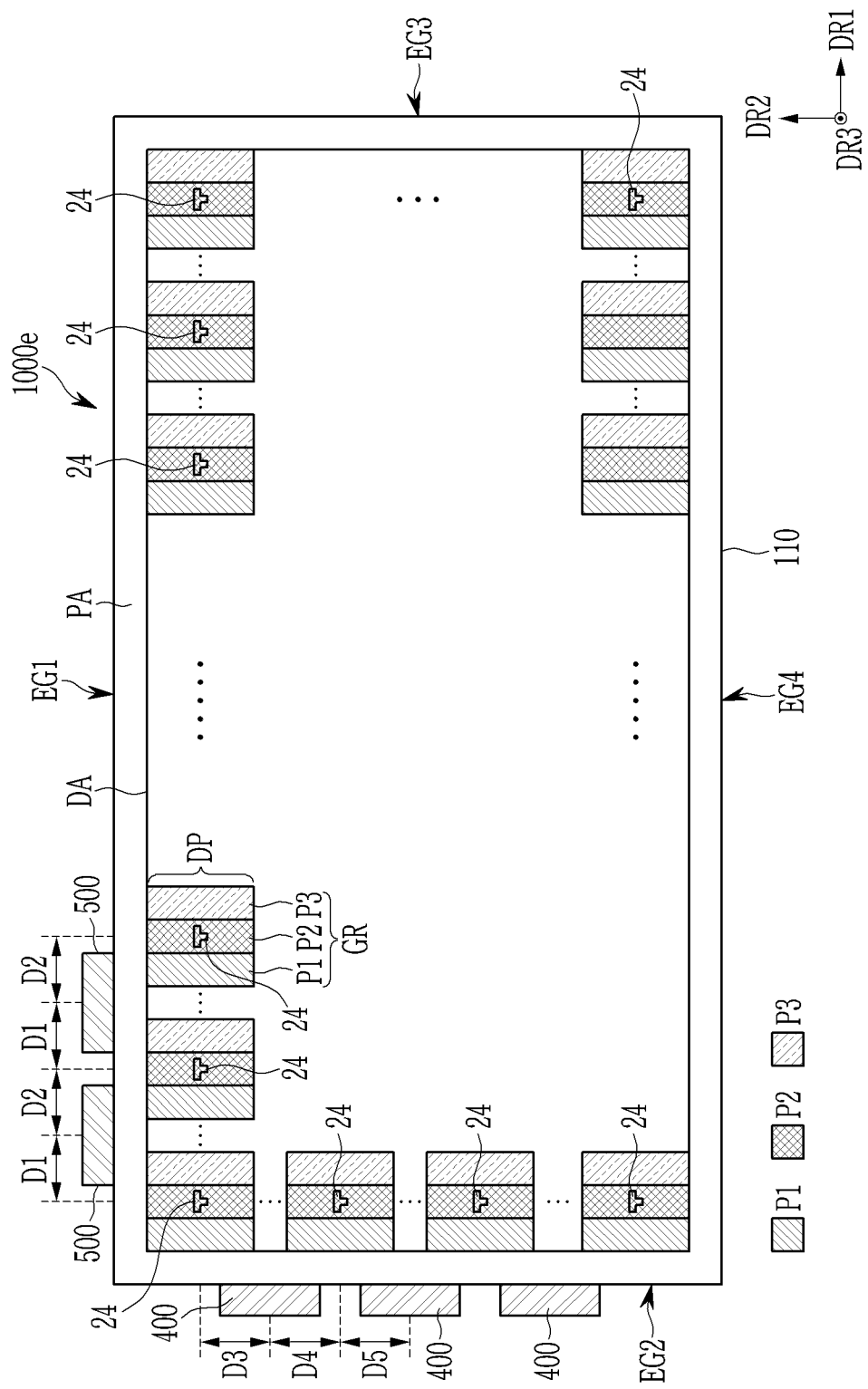
FIG. 12 illustrates a plane layout view of a display device according to an embodiment of the present disclosure.
Figure 13:
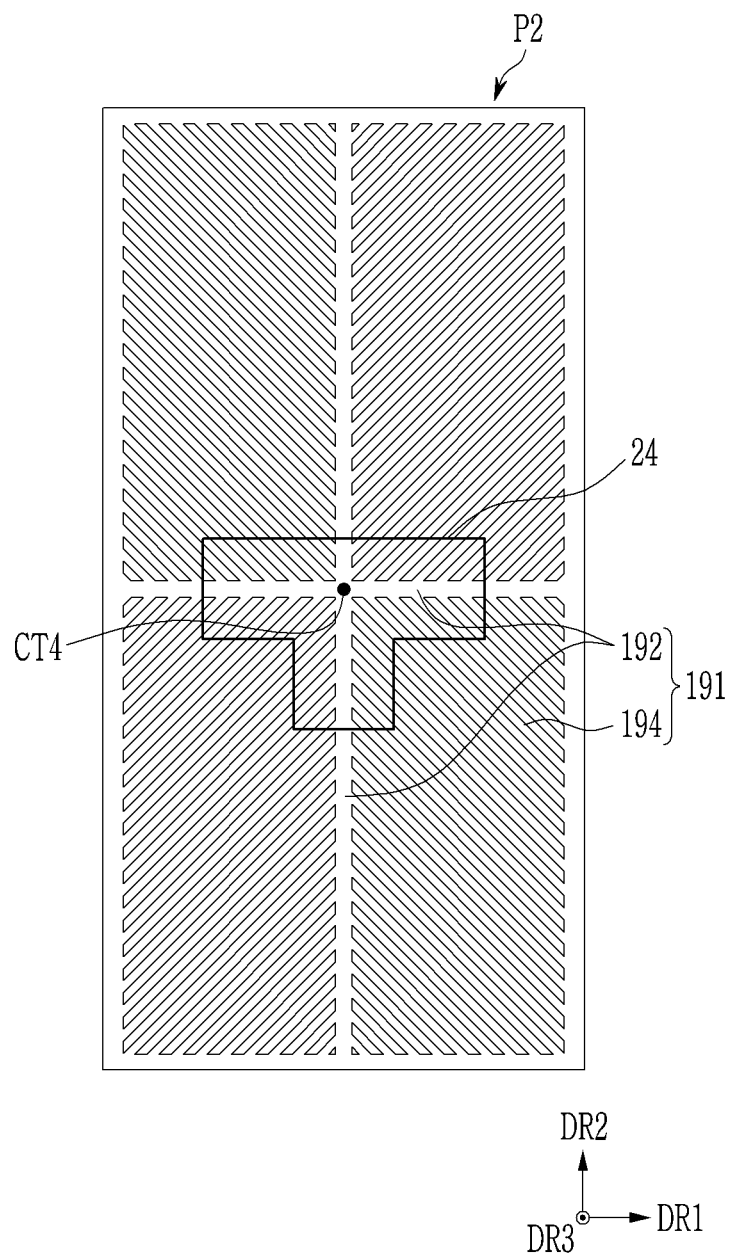
FIG. 13 illustrates a top plan view of a portion of one pixel where an alignment key of a display device according to an embodiment of the present disclosure is disposed.

FIG. 12 illustrates a plane layout view of a display device according to an embodiment of the present disclosure, and FIG. 13 illustrates a top plan view of a portion of one pixel where an alignment key of a display device according to an embodiment of the present invention is disposed.

The display device according to the present embodiment includes a display panel 1000e having most of the features of the display panels 1000, 1000a, 1000b, and 1000c of the display devices according to the above-described embodiments, but may include alignment keys and pixels P1, P2, and P3 having a different structure.

Specifically, the display panel 1000e of the display device according to the present embodiment may include a plurality of alignment keys 24 disposed in the display portion DP of the pixels DP, P2, and P3 of the display area DA instead of the various alignment keys 21, 21a, 22, 22a, and 23 described above. The alignment keys 24 may include an alignment key 24 disposed at the pixels P1, P2, and P3 of the pixel group GR disposed adjacent to edges of four corners of the display area DA, and an alignment key 24 that is arranged along the edges EG1 and EG2 of the substrate 110 to which the driving circuit portions 400 and 500 are attached and that is disposed in the pixels P1, P2, and P3 of the pixel group GR disposed closest to the edges EG1 and EG2.

The alignment keys 24 may also be disposed at the pixels P1, P2, and P3 of the pixel group GR disposed closest to the edges EG4 and EG3 respectively facing the edges EG1 and EG2 of the substrate 110, and in this case, a separate driving circuit portion may be attached to the edges EG3 and EG4 of the substrate 110.

The alignment keys 24 according to the present embodiment may not be disposed in a pixel group GR other than the pixel group GR disposed closest to the edges EG1, EG2, EG3, and EG4 of the substrate 110.

The alignment keys 24 may be used as a reference for designating an area or a position, so as to align a mask and a mother substrate when a plurality of layers are stacked and patterned on a the mother substrate during a manufacturing process of the display panel 1000e, or so as to align a cutting device and the mother substrate when the mother substrate is divided into cell units, so as to align the inspection device and the display panel 1000e when inspecting the display panel 1000e, or so as to align the display panel 1000e and components when assembling the components such as a polarizer, a circuit board, and a driving circuit portion to the display panel 1000e. The plurality of alignment keys 24 arranged along the edges EG1 and EG2 of the substrate 110 may be used when the driving circuit portions 400 and 500 are aligned in the display panel 1000e, and among them, four alignment keys 24 disposed adjacent to the edges of the four corners of the display area DA may be used to align the entire display panel 1000e with other devices or polarizers.

The alignment keys 24 are arranged along the edges EG1 and EG2 of the substrate 110, and may be disposed in the display portion DP of the second pixel P2 disposed at the center thereof among the pixels P1, P2, and P3 of the pixel group GR disposed closest to the edges EG1 and EG2. In this case, the plurality of alignment keys 24 may be symmetrically arranged in the display area DA.

Distances between the edges EG1, EG2, EG3, and EG4 of the substrate 110 immediately adjacent to the alignment keys 24 and the alignment keys 24 may be within a distance such that the alignment key recognition device such as a camera or laser that may recognize the alignment key 24 or move. The distances from the edges EG1, EG2, EG3 and EG4 of the substrate 110 to the alignment keys 24 adjacent thereto may be, for example, about 0.8 mm or less, but are not limited thereto and may vary depending on process equipment.

According to the embodiment of the present disclosure, since the alignment keys 24 are commonly disposed in the central second pixel P2 of the pixels P1, P2, and P3 of each pixel group GR, an amount of luminance reduction caused by the alignment key 24 may be uniform and the symmetry may be maintained. In addition, since all the alignment keys 24 are disposed in the second pixels P2 displaying the same color, the color coordinates of the image may be prevented from being distorted. As described above, the second pixel P2 may display a green color.

According to the embodiment of the present disclosure, a pair of adjacent alignment keys 24 may be disposed at opposite sides of one driving circuit portion 500 corresponding to the one driving circuit portion 500. The pair of adjacent alignment keys 24 may be used to align and attach the corresponding one driving circuit portion 500. The pair of adjacent alignment keys 24 may be symmetrically disposed based on the center of the corresponding driving circuit portion 500. In this case, the distance D1 from the center of the driving circuit portion 500 to the center of the alignment key 24 immediately to the left of the driving circuit portion 500 may be approximately equal to a distance D2 from the center of the driving circuit portion 500 to the center of the alignment key 24 immediately to the right of the driving circuit portion 500.

Alternatively, one alignment key 24 may be disposed between two adjacent driving circuit portions 500 along the first direction DR1. The alignment key 24 disposed between the two adjacent driving circuit portions 500 may be used to align and attach the corresponding two driving circuit portions 500 at opposite sides of the alignment key. The alignment key 24 may be disposed at a center between two centers of the corresponding two driving circuit portions 500. In this case, the distance D2 from the center of the driving circuit portion 500 disposed immediately to the left of the alignment key 24 to the center of the alignment key 24 may be approximately equal to the distance D1 from the center of the driving circuit portion 500 disposed immediately to the right of the alignment key 24 to the center of the alignment key 24. Accordingly, since the alignment key 24 is used to align the two driving circuit portions 500, the number of alignment keys may be reduced.

Similarly, a pair of adjacent alignment keys 24 may be disposed at opposite sides of one driving circuit portion 400 corresponding to the one driving circuit portion 400. The pair of adjacent alignment keys 24 may be used to align and attach the corresponding one driving circuit portion 400. The pair of adjacent alignment keys 24 may be symmetrically disposed based on the center of the corresponding driving circuit portion 400. In this case, the distance D3 from the center of the driving circuit portion 400 to the center of the alignment key 24 immediately above the driving circuit portion 400 may be approximately equal to the distance D4 from the center of the driving circuit portion 400 to the center of the alignment key 24 immediately below the driving circuit portion 400.

Alternatively, one alignment key 24 may be disposed between two adjacent driving circuit portions 400 along the second direction DR2. The alignment key 24 disposed between the two adjacent driving circuit portions 400 may be used to align and attach the corresponding two driving circuit portions 400 at and to opposite sides of the alignment key. The alignment key 24 may be disposed at a center between two centers of the corresponding two driving circuit portions 400. In this case, the distance D4 from the center of the driving circuit portion 400 disposed immediately above the alignment key 24 to the center of the alignment key 24 may be approximately equal to the distance D5 from the center of the driving circuit portion 400 disposed immediately below the alignment key 24 to the center of the alignment key 24. Accordingly, since the alignment key 24 is used to align the two driving circuit portions 400, the number of alignment keys may be reduced.

In FIG. 12, the alignment key 24 disposed near the corner where the two edges EG1 and EG2 of the substrate 110 meet may be used to align the entire display panel 1000e with other devices or polarizers, or may be used to align the driving circuit portions 400 and 500.

The planar shapes of the plurality of alignment keys 24 may be equal to each other, or may be different. For example, the planar shape of the alignment key 24 may be the "T" shape as shown in FIG. 12 or the cross shape (+).

According to the embodiment of the present disclosure, each pixel P1, P2, and P3 may include one display portion DP capable of displaying light of one luminance with respect to one image signal. A pixel electrode 191 as shown in FIG. 13 may be disposed in the display portion DP. The pixel electrode 191 may receive a data voltage.

The pixel electrode 191 may include a stem 192 and a plurality of branches 194 connected to the stem 192 in a plan view. The stem 192 may be a cross stem including a horizontal stem and a vertical stem that cross each other. The plurality of branches 194 may obliquely extend in the first direction DR1 and the second direction DR2.

The alignment key 24 may overlap the stem 192 of the pixel electrode 191 disposed in the display portion DP, and particularly, may overlap and enclose the center CT4 of the stem 192. More specifically, the center of the alignment key 24 may substantially coincide with the center CT4 of the stem 192 of the pixel electrode 191. The horizontally and vertically extending portions of the alignment key 24 may extend side by side with the horizontal and vertical portions of the stem 192 of the pixel electrode 191, and overlap the horizontal and vertical portions of the stem 192. Accordingly, a decrease in luminance of the second pixel P2 caused by the alignment key 24 may be minimized.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

<Description of Symbols>

| | |
|---|---|
| 3: liquid crystal layer | 110 and 210: substrate |
| 21, 21a, 22, 22a, 23, 24, 221, 222: alignment key | |
| 110, 210: substrate | 121: gate line |
| 140, 250: insulating layer | 171: data line |
| 181, 185a, 185b: opening | 191: pixel electrode |
| 191a, 191b: subpixel electrodes | 192, 192a, 192b: stem |
| 270: common electrode | 400, 500: driving circuit |
| 1000, 1000a, 1000b, 1000c, 1000d, 1000e: display panel | |
| DP, DP1, DP2: display portion | DA: display area |
| GR: pixel group | P1, P2, P3, PX: pixel |
| PA: peripheral area | TA: pixel circuit layer |

What is claimed is:

1. A display device comprising:
a substrate including a display area in which a plurality of pixel groups are disposed and a peripheral area disposed around the display area; and
a plurality of alignment keys disposed on the substrate,
wherein each of the pixel groups includes a plurality of pixels displaying different colors,
the plurality of alignment keys include a plurality of first alignment keys that are disposed in the pixel groups adjacent to edges of at least two corners of the display area and that are disposed in a plurality of first pixels that display a same color as each other among the plurality of pixels included in the pixel groups, and
each of the plurality of pixels includes a pixel electrode, and the pixel electrode overlaps an entirety of each of the plurality of alignment keys.

2. The display device of claim 1, wherein
each of the plurality of pixels includes a display portion that displays light, and
the first alignment key overlaps the display portion of the first pixel.

3. The display device of claim 2, wherein
the first pixel is disposed at a center of the plurality of pixels included in the pixel group.

4. The display device of claim 2, wherein
the first pixel includes the pixel electrode disposed in the display portion,
the pixel electrode includes a stem electrode and a plurality of branch-electrodes connected to the stem electrode, and
the first alignment key overlaps the stem electrode.

5. The display device of claim 4, wherein
the stem includes a cross shape,
the first alignment key overlaps and encloses a center of the stem having the cross shape, and
the first alignment key includes a portion extending along the stem electrode having the cross shape.

6. The display device of claim 2, wherein
the display portion included in the pixel includes a first display portion and a second display portion that display different luminances from each other with respect to an image signal, and
the first alignment key is disposed in the display portion that displays relatively lower luminance among the first display portion and the second display portion.

7. The display device of claim 2, wherein
an edge of the substrate includes a first edge extending along a first direction, and a second edge and a third edge that are connected to the first edge and extending along a second direction substantially perpendicular to the first direction, and
a distance from the first alignment key closest to the second edge to the second edge is equal to a distance from the third edge to the first alignment key closest to the third edge.

8. The display device of claim 1, wherein
the substrate includes a first edge extending along a first direction, and
the plurality of alignment keys further include a plurality of second alignment keys that are disposed in the pixel group disposed closest to the first edge among the plurality of pixel groups and that are disposed in a plurality of second pixels that display a same color as each other among the plurality of pixels included in the pixel groups.

9. A display device comprising:
a substrate including a display area in which a plurality of pixel groups are disposed and a peripheral area disposed around the display area; and
a plurality of alignment keys disposed on the substrate,
wherein each of the pixel groups includes a plurality of pixels displaying different colors,
the substrate includes a first edge extending along a first direction,
the plurality of alignment keys include a plurality of first alignment keys that are disposed in the pixel group disposed closest to the first edge and that are disposed in display portions of a plurality of first pixels that display a same color as each other among the plurality of pixels included in the pixel groups, and
each of the plurality of pixels includes a pixel electrode, and the pixel electrode overlaps an entirety of each of the plurality of alignment keys.

10. The display device of claim 9, wherein
each of the plurality of pixels includes a display portion that displays light, and
the first alignment key overlaps the display portion of the first pixel.

11. The display device of claim 10, wherein
the first pixel displays a lowest luminance among the plurality of pixels included in the pixel group with respect to an input image signal.

12. The display device of claim 10, wherein
the first pixel includes the pixel electrode disposed in the display portion,
the pixel electrode includes a stem electrode and a plurality of branch electrodes connected to the stem electrode, and
the first alignment key overlaps the stem electrode.

13. The display device of claim 10, wherein
the display portion included in the pixel includes a first display portion and a second display portion that display different luminances from each other with respect to an image signal, and
the first alignment key is disposed in the display portion closer to the first edge among the first display portion and the second display portion included in the pixel.

14. The display device of claim 10,
the display device further comprises a driving circuit portion attached to the substrate,
wherein two adjacent first alignment keys are disposed at opposite sides of the driving circuit portion based on a center of the driving circuit portion.

15. The display device of claim 10, the display device further comprises a plurality of driving circuit portions attached to the substrate,
wherein the first alignment key is correspondingly disposed between two adjacent driving circuit portions among the plurality of driving circuit portions, and
a distance from a center of the first alignment key to a centers of a first driving circuit portion of the two adjacent driving circuit portions is equal to a distance from the center of the first alignment key to a center of a second driving circuit portion of the two adjacent driving circuit portions.

16. The display device of claim 10, wherein
the first pixel is disposed closest to the first edge among the plurality of pixels included in the pixel group.

17. The display device of claim 16, wherein
the display portion included in the pixel includes a first display portion and a second display portion that display different luminances from each other with respect to an image signal, and
the first alignment key is disposed in a display portion that displays relatively lower luminance among the first display portion and the second display portion included in the pixel.

18. The display device of claim 9, wherein
the substrate further includes a second edge connected to the first edge and extending along a second direction substantially perpendicular to the first direction,
the plurality of alignment keys further include a plurality of second alignment keys that are disposed in the pixel group disposed closest to the second edge among the plurality of pixel groups and that are disposed in display portions of a plurality of second pixels that display a same color as each other among the plurality of pixels included in the pixel groups, and
the second pixel and the first pixel display the same color as each other.

19. A display device comprising:
a substrate including a display area in which a plurality of pixel groups are disposed and a peripheral area disposed around the display area; and
an alignment key disposed on the substrate,
wherein each of the pixel groups includes a plurality of pixels displaying different colors,
a first pixel included in the plurality of pixels includes a pixel electrode disposed in a display portion that displays light,
the pixel electrode includes a stem electrode and a plurality of branch-electrodes connected to the stem electrode, and
the alignment key overlaps the stem electrode and is opaque.

20. The display device of claim 19, wherein
the stem includes a cross shape,
the first alignment key overlaps and encloses a center of the stem electrode having the cross shape, and
the first alignment key includes a portion extending along the stem electrode having the cross shape.

* * * * *